(12) United States Patent
Steffens, Jr.

(10) Patent No.: US 6,282,473 B1
(45) Date of Patent: Aug. 28, 2001

(54) SYSTEM AND METHOD FOR CONTROLLING A VEHICLE OCCUPANT PROTECTION DEVICE

(75) Inventor: Charles E. Steffens, Jr., Washington, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/455,731

(22) Filed: Dec. 7, 1999

(51) Int. Cl.[7] ................................................ B60R 21/32
(52) U.S. Cl. ............................. 701/45; 280/735; 180/272
(58) Field of Search .............................. 701/45; 180/272, 180/268, 668; 280; 208/735

(56) References Cited

U.S. PATENT DOCUMENTS

| | | |
|---|---|---|
| 5,330,226 | 7/1994 | Gentry et al. . |
| 5,626,359 | 5/1997 | Steffens, Jr. et al. . |
| 5,785,347 * | 7/1998 | Adolph et al. .................. 280/735 |
| 5,848,802 * | 12/1998 | Breed et al. .................. 280/735 |
| 5,904,368 * | 5/1999 | Blackburn et al. .............. 701/45 |
| 5,947,514 * | 9/1999 | Keller et al. .................. 280/735 |
| 5,954,775 | 9/1999 | Cluff . |
| 6,036,225 * | 3/2000 | Foo et al. .................... 280/735 |
| 6,094,610 * | 7/2000 | Steffens, Jr. et al. ............ 701/45 |
| 6,116,639 * | 9/2000 | Breed et al. ................... 701/45 |

* cited by examiner

Primary Examiner—Richard M. Camby
(74) Attorney, Agent, or Firm—Tarolli, Sundheim, Covell, Tummino & Szabo, L.L.P.

(57) ABSTRACT

A system (10) for controlling a vehicle occupant protection device (52) associated with a vehicle seat (12) includes a weight sensor (40) operative to sense a weight condition of an occupant (26) of the vehicle seat (12) and provide a weight sensor signal. A second sensor (50) is operative to sense a second condition of the occupant (26) and provide a second sensor signal. A controller (34) receives the weight sensor signal and the second sensor signal. The controller (34) analyzes the weight sensor signal and the second sensor signal to determine inconsistencies between the weight sensor signal and the second sensor signal and enables actuation of the occupant protection device (52) if the weight sensor signal and the second sensor signal are inconsistent.

18 Claims, 3 Drawing Sheets

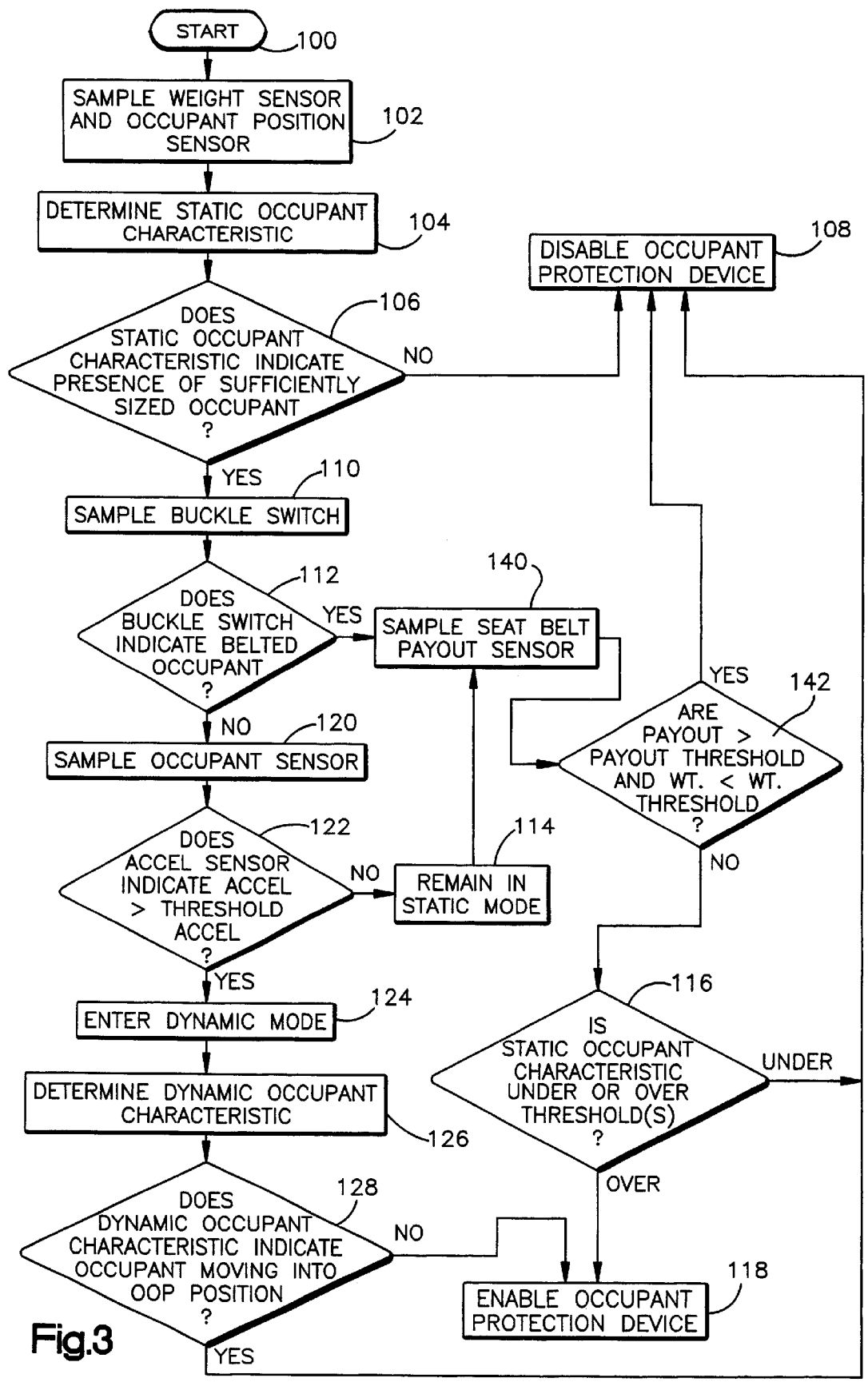

SYSTEM AND METHOD FOR CONTROLLING A VEHICLE OCCUPANT PROTECTION DEVICE

TECHNICAL FIELD

The present invention is directed to a system and method for controlling actuation of a vehicle occupant protection device.

BACKGROUND OF THE INVENTION

A typical vehicle occupant protection system includes a crash sensor, such as an accelerometer, an inflatable air bag, and an actuation circuit that controls the actuation of the air bag in response to an output signal from the crash sensor. The actuation circuit includes a controller that evaluates the output signal from the crash sensor signal and provides an actuation signal when it determines that a vehicle crash event is occurring for which actuation of the air bag is desired.

Systems have been developed to control the amount of inflation of the air bag in response to a detected occupant position and/or occupant weight. Examples of this type of system are disclosed in U.S. Pat. No. 5,330,226 to Gentry et al., and U.S. Pat. No. 5,626,359 to Steffens, Jr. et al.

SUMMARY OF THE INVENTION

The present invention is directed to a system for controlling a vehicle occupant protection device associated with a vehicle seat. The system includes a weight sensor operative to sense a weight condition of an occupant of the vehicle seat and provide a weight sensor signal. A second sensor is operative to sense a second condition of the occupant and provide a second sensor signal. A controller receives the weight sensor signal and second sensor signal. The controller analyzes the weight sensors signal and second sensor signal to determine inconsistencies between the weight sensor signal and second sensor signal. The controller enables actuation of the occupant protection device if the weight sensor signal and the second sensor signal are inconsistent.

Another aspect of the present invention is directed to a sensing system for use in a vehicle. The system includes at least two sensors. Each of the sensors is operative to sense a different condition of a vehicle occupant associated with a vehicle seat and to provide a sensor signal indicative of the sensed condition. An acceleration sensor is operative to sense acceleration of the vehicle and provide an acceleration signal. A controller is responsive to the sensor signals and the acceleration signal. The controller has a first operating mode when the acceleration signal indicates vehicle acceleration less than or equal to a first acceleration threshold. The controller has a second operating mode when the acceleration signal indicates acceleration greater than the first acceleration threshold. When the controller is in the first operating mode, it is operative to control actuation of a vehicle occupant protection device based on the sensed occupant condition being indicated by each of the sensor signals and the acceleration signal exceeding a second acceleration threshold. When the controller is in the second operating mode, it is operative to determine an occupant characteristic indicative of how each of the occupant conditions sensed by the occupant condition sensors varies over time. The controller controls actuation of the vehicle occupant protection device, when in the second operating mode, based on the acceleration signal exceeding the second acceleration threshold and based on the determined occupant characteristics.

Yet another aspect of the present invention is directed to a method for helping to protect an occupant located in a vehicle seat. The method includes the steps of sensing vehicle acceleration and providing an acceleration signal based on the sensed acceleration. First and second vehicle occupant condition signals are sampled over time. A determination is made as to how each of the first and second occupant conditions changes over a plurality of sampling intervals. Actuation of an occupant protection device is enabled if the first and second occupant conditions change inconsistently over the plurality of sampling intervals.

BRIEF DESCRIPTION OF THE DRAWINGS

The foregoing and other features and advantages of the present invention will become apparent to those skilled in the art to which the present invention relates upon reading the following description of the invention with reference to the accompanying drawings, in which:

FIG. 3 is a flow diagram illustrating operation of the system of FIG. 1 in accordance with another embodiment of the present invention.

DESCRIPTION OF PREFERRED EMBODIMENTS

Figure 1:
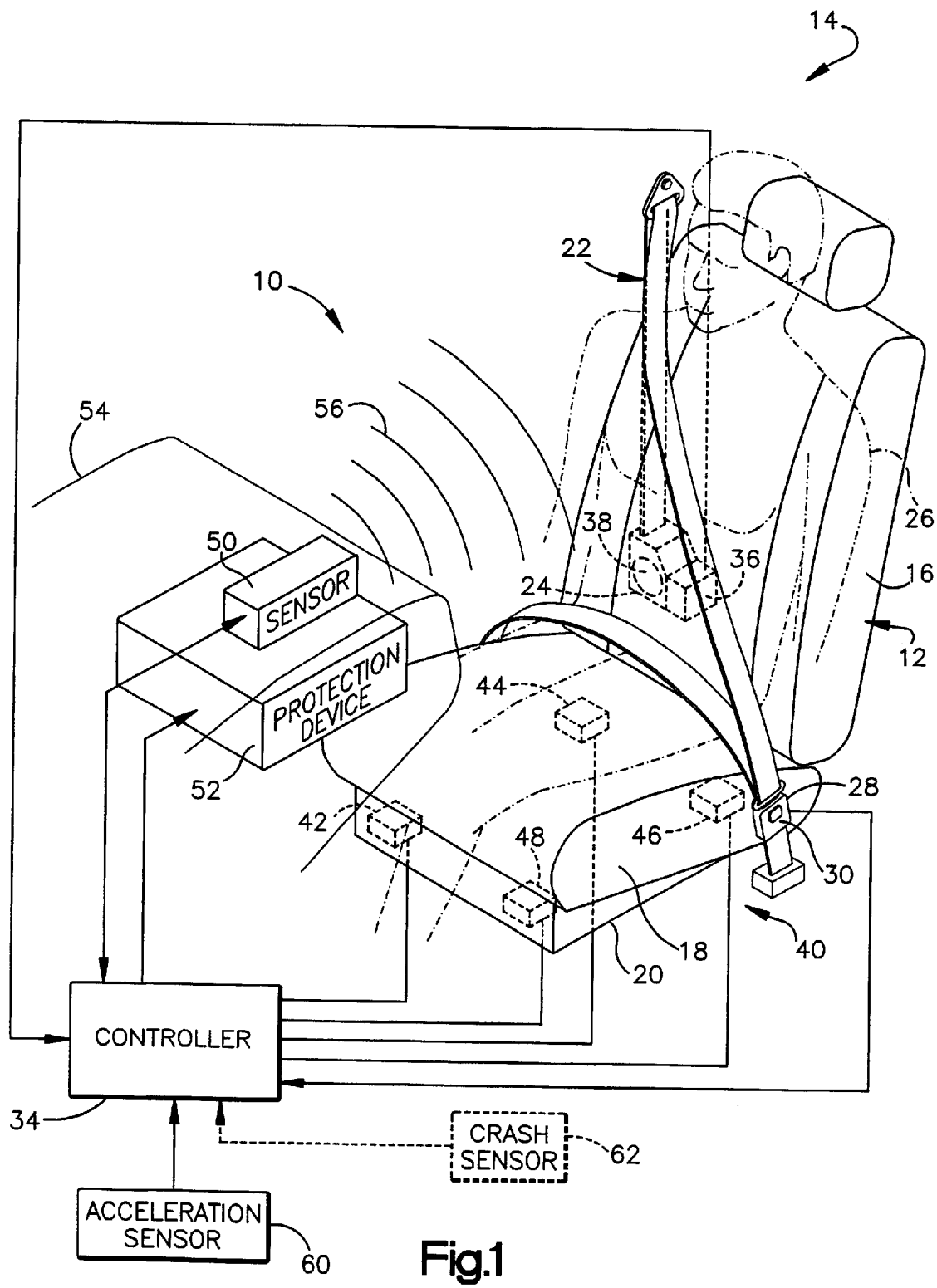
FIG. 1 is a schematic block diagram showing an occupant protection system in accordance with a preferred embodiment of the present invention.

FIG. 1 illustrates a vehicle occupant protection system 10 for helping to protect a vehicle occupant located in an associated vehicle seat 12. While the system 10 is illustrated as being associated with a front passenger-side seat 12 of a vehicle 14, the present invention is equally applicable to helping protect an occupant of a driver-side seat or other passenger seats. The vehicle seat 12 includes a seat back portion 16 and a seat cushion 18 and is connected to a vehicle floor 20.

The system 10 includes a seat belt 22. One end of the seat belt 22 is secured to the vehicle 14 at a first location 24 in a known manner. It is also contemplated that the seat belt 22 may be secured to the vehicle seat 12.

The seat belt 22 is extensible about a vehicle occupant 26 as is well known in the art. In particular, one end of the seat belt 22 is releasably secured to a seat belt buckle assembly 28 using a tongue and buckle arrangement. The buckle assembly 28 is secured to the vehicle 14 in a known manner. It is also contemplated that the seat belt buckle assembly 28 may be secured directly to the vehicle seat 12.

The seat belt buckle assembly 28 includes a seat belt buckle switch, indicated at 30, which is electrically connected to a controller 34. The seat belt buckle switch 30 provides a signal to the controller 34 having an electrical characteristic indicating whether the seat belt tongue and buckle are in a latched condition.

A webbing or seat belt payout sensor 36 also is electrically connected with the controller 34. The payout sensor 36 provides a signal to the controller 34 having an electrical characteristic indicative of the length of seat belt 22 that has been withdrawn from an associated seat belt retractor 38. The length of seat belt 22 withdrawn from the retractor 38 provides an indication of the occupant's girth, as well as an indication of whether an object other than a vehicle occupant has been strapped to the vehicle seat 12.

The system 10 also includes an occupant weight sensor or scale 40 operatively associated with the lower seat cushion 18. The weight sensor 40 is formed, for example, of four individual weight sensors 42, 44, 46, and 48 electrically connected with the controller 34. The weight sensors 42, 44, 46, and 48 are located at the corners of the seat cushion 18 and may be mounted within the seat cushion 18 or connected between the seat cushion and the vehicle floor 20. Each of the sensors 42, 44, 46, and 48 provides a respective signal to the controller 34 having an electrical characteristic indicative of the measured weight sensed by each sensor. The signals from the sensors 42, 44, 46, and 48 collectively provide an indication of a measured weight of an object located on the lower seat cushion 18.

Preferably, the weight sensor 40 is also configured to provide an indication of the location of the center of gravity of the vehicle occupant 12 relative to seat cushion 18 of the vehicle seat 12. This is accomplished, for example, by the controller 34 comparing the weight measurements provided by each of the weight sensors 42, 44, 46, and 48 in light of the known location of each sensor relative to the lower seat cushion 18.

It is also contemplated that the weight sensor 40 could be formed of a lesser or greater number of individual weight sensors, such as fore and aft weight sensors or a grid array of weight sensors located in the seat cushion 18, respectively. The present invention also contemplates that the weight sensor 40 could be formed of other types of sensors capable of detecting an occupant's center of gravity. For example, pattern recognition technologies, such as produced by IEE, which infer weight by measuring the print of an object on the vehicle seat, also could be used as the weight sensor 40 in accordance with the present invention.

The system 10 further includes an occupant position sensor 50 operative to sense the position of the occupant 26 located in the vehicle seat 12. The sensor 50 is electrically connected with the controller 34 and operative to provide a signal having an electrical characteristic indicative of the position of the vehicle occupant 26. In particular, the occupant position sensor 50 provides an indication of the relative distance between the vehicle occupant 26 and a portion of an occupant protection device 52, such as the cover of an air bag module.

The occupant position sensor 50 preferably is an ultrasonic sensor, such as disclosed in U.S. Pat. No. 5,626,359 to Steffens, Jr. et al. The ultrasonic sensor 50 is mounted in a dashboard, roof, or instrument panel 54 of the vehicle 14 adjacent to the occupant protection device 52. The controller 34 triggers the ultrasonic sensor 50 to produce an ultrasonic pulse 56. When the ultrasonic pulse 56 strikes the occupant 26, a reflected pulse is returned to the ultrasonic sensor 50. The ultrasonic sensor 50, in turn, provides a signal to the controller 34. The controller 34 determines the time between transmission of the ultrasonic pulse 56 and receipt of the reflected pulse and, from the time differential, calculates the distance between the ultrasonic sensor 50 and the occupant. Because the controller 34 "knows" the location of the cover of the air bag module relative to the ultrasonic sensor 50, the distance between the vehicle occupant 26 and the cover of the air bag module is easily calculated using a predetermined formula or look-up table.

Alternatively or in addition to the sensor 50 described above, one or more other occupant position sensors may be used in connection with present invention. For example, an occupant position sensor might be located within the vehicle seat 12 and aimed towards the front of the vehicle 14 to detect the distance between the vehicle occupant 26 and the vehicle seat. A sensor also could be mounted to the vehicle roof to detect the position of the vehicle occupant 26 relative to the occupant protection device 52. Further, a sensor could be located in a vehicle door to measure the distance between the vehicle occupant 26 and the occupant protection device 52.

It is also contemplated that other types of occupant position sensors may be used including, for example, a capacitive position sensor, such as disclosed in U.S. Pat. No. 5,722,686 to Blackburn et al., or an infrared position sensor, such as disclosed in U.S. Pat. No. 5,330,226 to Gentry et al.

The occupant protection device 52 preferably is an inflatable occupant protection restraint device which, when actuated, helps protect a vehicle occupant 26 during a vehicle crash event. In particular, the occupant protection device 52 includes an air bag operatively mounted in a housing located in the instrument panel 54 of the vehicle 14. The controller 34 is electrically connected to the occupant protection device 52, such as to a squib (not shown) for actuating an inflator to provide fluid for inflating the air bag. Upon determining the occurrence of vehicle crash event, the controller 34 provides an actuation signal to the squib. This ignites the squib, which actuates the inflator to provide inflation fluid to inflate the air bag. Inflators with single or multiple levels also could be used.

Under certain circumstances, however, it is desirable to not to actuate the vehicle occupant protection device 52, even during a vehicle crash event. In an embodiment using a multi-stage air bag, it may be desirable to control the level of inflation, such as by actuating a single stage of the multi-stage device. The system 10, in accordance with the present invention, helps to detect such circumstances and disable or enable the occupant protection device 52 as is appropriate.

The system 10 includes an acceleration sensor 60 electrically connected to the controller 34. The acceleration sensor 60 is operative to provide an acceleration signal based on the sensed vehicle acceleration.

The acceleration sensor 60 is, for example, an accelerometer that provides a signal having an electrical characteristic indicative of vehicle acceleration. Preferably, the acceleration sensor 60 is operative to detect a level of vehicle acceleration of about 1 g and, more preferably, a level of about 0.7 g (g being the value of acceleration due to earth's gravity, i.e., 32 feet per second squared or 9.8 m/s$^2$). This level of acceleration typically occurs during rapid vehicle deceleration, such as due to braking, or during evasive steering maneuvers. Such situations often indicate an increased likelihood of the occurrence of a vehicle crash event. At the same time, however, this level of acceleration is below a level of acceleration indicative of a vehicle crash event that warrants actuation of the vehicle occupant protection device 52 by the controller 34. Preferably, the controller 34 is able to determine the occurrence of both a vehicle crash event and an increased likelihood of a crash event based on the acceleration signal from the same sensor 60.

It is contemplated that the acceleration sensor 60 might be another type of acceleration sensing device, such as an electromechanical switch or a micromachined acceleration switch. These types of acceleration sensing devices have parts that move in response to being exposed to a level of vehicle acceleration above a predetermined threshold. Such an acceleration threshold should be set sufficiently low so as to detect rapid deceleration and evasive steering maneuvers.

In addition to the acceleration sensor 60, the system 10 might include an optional crash event sensor, shown in dashed lines at 62. The crash event sensor 62, for example, may be an acceleration sensor that is electrically connected to the controller 34 and provides an acceleration signal to the controller indicative of the sensed vehicle acceleration. When both the acceleration sensor 60 and the crash event sensor 62 are used, at least one of the sensors 60 is configured to have a sensitivity capable of detecting vehicle acceleration of about 0.7 g (e.g., a nominal sensitivity of about 4 g). The crash event sensor 62 may be less sensitive, such as having a nominal sensitivity of about 100 g. The crash event sensor 62 alternatively could be a crush zone sensor or other type of sensor that detects deformation of part of the vehicle 14.

The controller 34 is, for example, a microcontroller or microcomputer programmed to control actuation of the vehicle occupant protection device 52 in response to the signals sampled from the various sensors 30, 36, 40, 50, and 60 (and 62, if part of the system). In accordance with the present invention, the controller 34 determines whether to enable or disable actuation of the vehicle occupant protection device 52 based on a determined vehicle occupant characteristic. In an embodiment of the present invention having a multi-stage occupant protection device 52, the controller 34 may limit the level of inflation provided by the multi-stage device based on the determined occupant characteristic. The determined occupant characteristic may be an instantaneous sensed occupant condition or, alternatively, a dynamic occupant characteristic that varies over time. Provided that the vehicle occupant protection device 52 is enabled, the controller 34 actuates the vehicle occupant protection device upon determining the occurrence of a vehicle crash event, such as the sensor 60 sensing a level of vehicle acceleration indicative of a vehicle crash event in which deployment of the protection device is desirable.

The controller 34 preferably determines different occupant characteristics depending on the level of acceleration being experienced by the vehicle, as indicated by the acceleration signal from the acceleration sensor 60. In particular, when the controller 34 determines that the acceleration signal indicates a level of acceleration below an acceleration threshold level, such as about 0.7 g, the controller operates in a static mode. In the static mode, the controller 34 determines an occupant characteristic based on the most recent sampling of at least two of the occupant condition sensors 30, 40, 50, and 36.

For example, the controller 34 determines whether the vehicle occupant currently is in an out-of-position position relative to the protection device 52, is so light as to be a child, or is belted or unbelted, and/or whether an excessive amount of seat belt webbing 22 has been withdrawn from the retractor 38. Each of these determinations in the static mode results in logic control of the occupant protection device 52, i.e., either the protection device is enabled (ON) or enabled for low output curve (ON) enabled for a low output level (e.g., actuation of a single stage), or disabled (OFF).

On the other hand, when the controller 34 determines that the acceleration sensor signal indicates a level of acceleration equal to or greater than the acceleration threshold level (e.g., about 0.7 g), the controller operates in a dynamic mode. The dynamic mode typically is active in situations when there is an increased likelihood of a vehicle crash event, such as during evasive steering maneuvers or deceleration due to braking. In the dynamic mode, the controller 34 analyzes each of the occupant conditions sensed by the occupant condition sensors 40 and 50 over a plurality of recent sampling intervals to determine how each of the sensed occupant conditions varies over time.

By way of example, the controller 34 preferably analyzes a preselected plurality of the most recent samplings of the sensor signals from sensors 40 and 50 to determine whether the sampled signals indicate continuous movement to an OOP position, movement to a normal position, or sporadic movement back and forth. This determination may be based on comparing each set of sampled data signals with a corresponding set of stored data, which may be stored in a look-up table of the controller 34. The controller 34 will not disable the occupant protection device 52 while in the dynamic mode unless the sampled signals from both sensors 40 and 50 indicate movement of the occupant 26 to an OOP position. Therefore, if the controller 34 determines that each sampled set of signals from the occupant condition sensors 40 and 50 indicates the occupant's position is changing from a normal position to an OOP position, the controller disables the vehicle occupant protection device 52. This advantageously helps the controller 34 distinguish between actual movement of the occupant 26 to an OOP position and other types of occupant movement, such as arm movement in front of the sensor 50, or a malfunction in one of the sensors 40 or 50.

Similarly, the controller 34 is configured to enable the vehicle occupant protection device 52 if both sets of signals from sensors 40 and 50 over time indicate that the occupant's position is rapidly changing from an OOP position to a normal position. In that situation, it would be desirable to actuate the vehicle occupant protection device upon detecting a vehicle crash event. Accordingly, the controller 34 operates in the dynamic mode to "predict" whether the signals sampled over time indicate that the occupant 26 is moving toward a normal position or toward an OOP position. The controller 34 disables the occupant protection device 52 only upon confirming occupant movement to an OOP position based on signals from sensors 40 and 50. If the controller determines the occupant 26 is moving to a normal position or if the sampled sets of signals from sensors 40 and 50 are inconsistent, the occupant protection device 52 is enabled.

While, for purposes of explanation, the acceleration signals and corresponding thresholds are described as being actual acceleration values, the acceleration signals may be processed using a variety of algorithms to provide signals functionally related to the sensed acceleration. The resulting signals may, in accordance with the present invention, be compared with appropriate threshold values to determine if the controller is in the dynamic mode, static mode as well as whether a vehicle crash event has occurred for which actuation of the protection device 52 is desired. Examples of suitable alternative acceleration-based control algorithms are disclosed in U.S. Pat. No. 5,935,182, U.S. Pat. No. 5,758,899 and U.S. Pat. No. 5,587,906.

Figure 2:
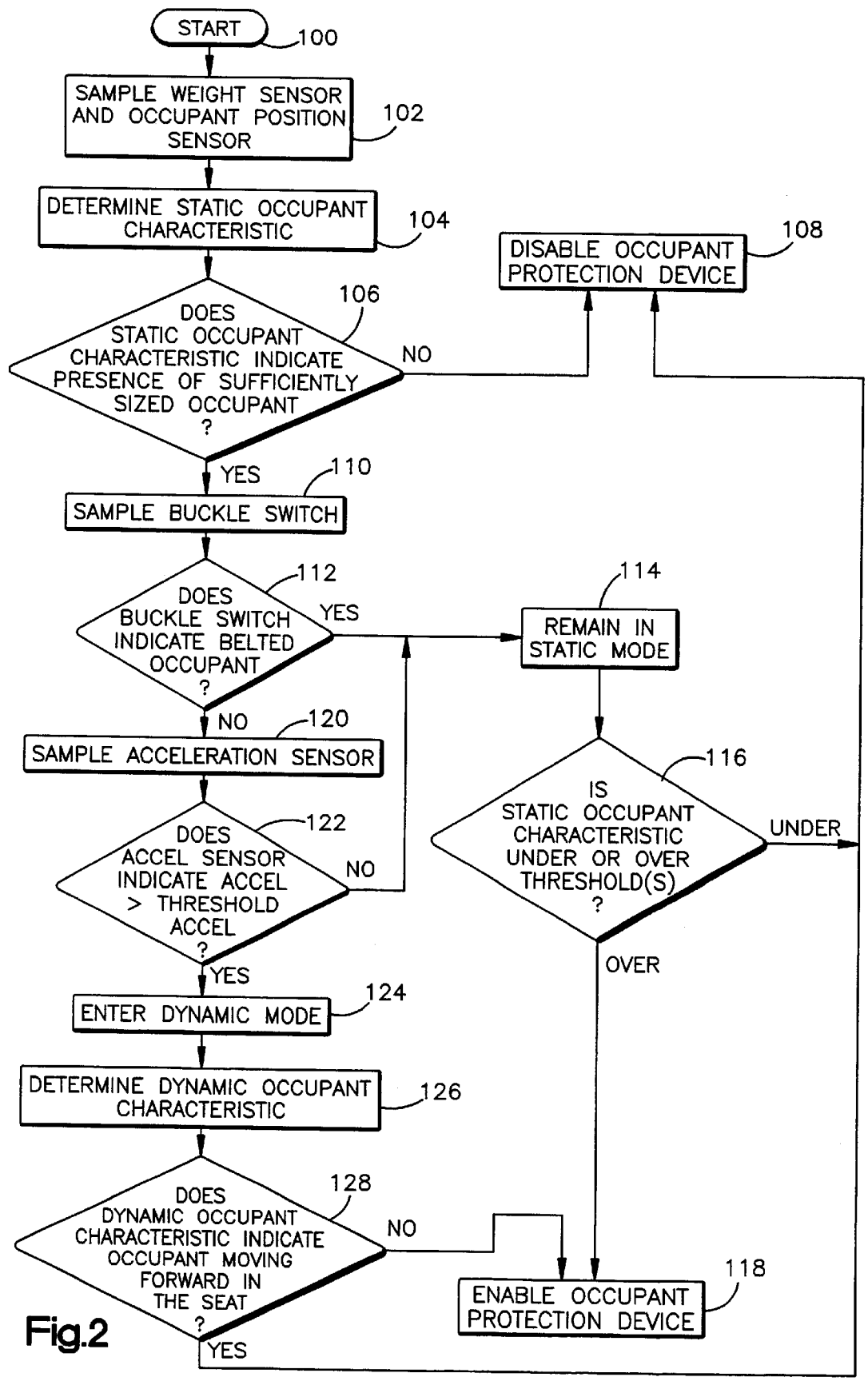
FIG. 2 is a flow diagram illustrating operation of the system of FIG. 1 in accordance with an embodiment of the present invention.

The operation of the controller 34, in accordance with a preferred embodiment of the present invention, will be better appreciated with reference to the flow diagrams of FIGS. 2 and 3. Referring to FIG. 2, the operation process begins at step 100 which occurs, for example, at power-up of the vehicle. When the vehicle is powered up, the internal states of the controller 34 are initialized and appropriate flag conditions are set to their initial values, including entering the static mode described above.

The process proceeds to step 102 in which the signals from the occupant condition sensors 40 and 50 are sampled. For the system 10 shown in FIG. 1, this includes sampling signals from the occupant position sensor 50 and the weight sensor 40. The signals are sampled at regular intervals and are stored in appropriate memory of the controller 34.

The process then proceeds to step 104 in which the controller 34 determines a static occupant characteristic based on the occupant conditions currently being sensed, namely, the position and weight of the occupant 26. In addition to determining the weight of the vehicle occupant, the controller preferably also determines a location for the occupant's center of gravity based on the signals from weight sensors 42, 44, 46, and 48. The occupant's weight (or a weight of an object on the seat 12) may be determined based on compensated values of the signals from the sensors 42, 44, 46, and 48. This determination may be made using a predetermined formula or appropriate look-up tables stored in the controller 34.

In addition, a characteristic or value indicative of the occupant's position relative to part of the vehicle occupant protection device 52 is determined based on the sampled signal from sensor 50. This determination may be made using a predetermined formula or look-up tables. The sampled weight and position signals are stored in appropriate memory of the controller 34. Alternatively, or in addition to the sampled signals, the determined weight and position characteristics may be stored.

As stated above, the controller 34 stores in memory a plurality of the most recent samplings of the sensed weight and position signals for the occupant 26. The static occupant condition characteristics are determined based the most recent sampling of the signals from occupant condition sensors 40 and 50.

The process proceeds to step 106 in which a determination is made whether the determined static occupant condition information is such that it would be desirable to actuate the occupant protection device 52 during a vehicle crash event. For the system of FIG. 1, this includes determining whether the vehicle occupant 26 is too close to the occupant protection device 52. It also includes determining whether the weight of the vehicle occupant has a compensated weight value (e.g., less than about 30–40 kg) for which it would be undesirable to actuate the occupant protection device 52 upon the occurrence of a vehicle crash event.

If either determination in step 106 is negative, thereby indicating that the occupant is too close to the occupant protection device and/or too small, the process proceeds to step 108. At step 108, the occupant protection device 52 is disabled or turned off, such as by the controller 34 setting an appropriate flag condition in memory. On the other hand, if the determination at step 106 is affirmative, thereby indicating that the vehicle occupant 26 is of sufficient weight and at a desirable position relative to the occupant protection device 52, the process proceeds to step 110.

In step 110, the controller 34 samples the buckle switch signal from the buckle switch sensor 30 to obtain an indication of whether the vehicle occupant 26 is in a belted or unbelted condition. The process proceeds to step 112 in which a determination is made whether the buckle switch signal indicates a belted vehicle occupant condition. In the event that the buckle switch signal indicates that the vehicle occupant 26 is belted, the process proceeds to step 114. Because a belted vehicle occupant 26 is less likely to slide off the vehicle seat 12 into an OOP position than an unbelted vehicle occupant, the controller 34 remains in the static operating mode (step 114).

From step 114, the control process proceeds to step 116 in which each of the determined static occupant characteristics is compared against associated threshold levels. Specifically, the controller 34 determines whether the most recent sample of the occupant position sensor signal from sensor 50 indicates an occupant position relative to the occupant protection device 52 that is less than a predetermined distance from the protection device. The controller 34 also determines whether the most recent sampling of the occupant weight signals from sensors 42, 44, 46, and 48 indicates a weight value and/or a relative center of gravity position value below respective predetermined threshold values.

When at least one of the determined occupant characteristics is below its respective threshold, indicating that a reason exists for not actuating the occupant protection device 52, the process returns to step 108. At step 108, the occupant protection device is disabled. On the other hand, if each of the determined occupant characteristics is determined to be within normal operating parameters and above its respective threshold value, the control process proceeds to step 118. At step 118, the controller 34 enables the occupant protection device 52, such as by setting an appropriate flag condition.

If the determination at step 112 is negative, thereby indicating that the vehicle occupant 26 is in an unbelted condition, the process proceeds to step 120. Because the occupant is determined to be unbelted, there is an increased likelihood that the occupant 26 might move into an OOP position, such as by sliding off the lower seat cushion 18, especially when the vehicle 14 experiences an increased level of acceleration. In step 120, the controller 34 samples the acceleration sensor signal from the acceleration sensor 60. As stated above, the acceleration signal may provide an indication of the absolute vehicle acceleration or, alternatively, may provide an indication whether the vehicle acceleration is above or below a predetermined level of acceleration, such as about 0.7 g.

The process proceeds to step 122 in which a determination is made whether the acceleration sensor signal from the acceleration sensor 60 indicates an acceleration greater than the acceleration threshold level. This acceleration threshold level is selected to provide a threshold level of acceleration that is less than the level of acceleration required for actuation of the associated occupant protection device 52, yet still indicate an increased likelihood of a vehicle crash event. As stated above, this may occur as a result of rapid deceleration by braking or during an evasive steering maneuver.

If the sensed acceleration from the sensor 60 is not determined to be greater than the acceleration threshold level, the process returns to step 114 and the controller 34 remains in the static mode. On the other hand, if the sensed acceleration is greater than the acceleration threshold level, the control process proceeds to step 124 in which the controller 34 enters the dynamic operating mode.

For simplicity of explanation, the operation of the system 10, thus far, has been described as a series of steps. The operation of the system 10 equally could be expressed as a plurality of states or operating modes that change in response to the sensed conditions. The dynamic operating mode preferably is entered upon the acceleration signal from the sensor 60 indicating a vehicle acceleration above the predetermined acceleration threshold level, such as about 0.7 g.

The process proceeds to step 126 in which the controller 34 determines a dynamic occupant characteristic based on a plurality of the most recent samplings of the stored sensor signals from the occupant condition sensors 40 and 50. In the dynamic mode, the controller 34 characterizes how each of the sensed occupant conditions varies over time based on the stored signal samples from the sensors 40 and 50. This characterization may include interpolating between adjacent sampled values to obtain a more continuous representation of each of the sensed occupant conditions.

The process next proceeds to step 128 in which the controller 34 analyzes the sensed occupant position based on a plurality of consecutive samples of the signal from the position sensor 50 to characterize how the occupant's position changes over the sampling time interval. The controller 34 then compares this characterization against stored occupant position information to determine whether the characterization indicates occupant movement to an OOP position.

Similarly, the controller 34 analyzes the sensed occupant weight values from each of the weight sensors 42, 44, 46, and 48 over a plurality of consecutive sampling intervals to characterize how the occupant's weight distribution on the seat cushion 18 changes over the sampling time interval. The controller 34 then compares this characterization against stored weight distribution information to determine whether the characterization indicates occupant movement to an OOP position.

If the determination at step 128 is negative, thereby indicating that at least one of the determined occupant characterizations does not indicate movement to an out-of-position position, the process returns to step 118. If the controller 34 determines that the weight distribution and occupant position characterizations either are inconsistent or both indicate movement to a normal position, the controller enables the occupant protection device 52 (step 118), such as by setting the appropriate flag condition in memory.

On the other hand, if it is determined that the weight distribution and position characterizations vary over the sampling interval so as both to indicate occupant movement to an OOP position (step 128), the control process proceeds to step 108. At step 108, the occupant protection device 52 is disabled, such as by the controller 34 setting an appropriate flag condition.

As described above, when vehicle acceleration is above the acceleration threshold (e.g., 0.7 g), the system 10 in accordance with the present invention provides protection against false detection of the occupant being in an OOP position. Specifically, making a position determination based on signals from both sensors 40 and 50 helps to eliminate a false OOP position determination.

The system 10 further helps eliminate erroneous actuation of an occupant protection device 52 for an underweight vehicle occupant having a weight at or near the imposed response limits of the system 10. For example, a detected weight for a child or other lightweight vehicle occupant having a weight at or near a fixed weight threshold might exceed the threshold during periods of increased vehicle acceleration. This increase in detected weight may be due to acceleration forces and/or due to forces from the lap portion of a seat belt. Such an increase in the detected weight could, in a conventional system, permit actuation of an associated occupant protection device. The system 10, in accordance with the present invention, is able to detect such an increase in the detected weight based on the signals from the sensor 40 and determine the cause of such weight increase. This determination, based on detecting such changes in the occupant's weight during periods of increased acceleration, enables the system 10 to turn OFF the occupant protection device despite the increase in detected weight.

The operation of the controller 34, in accordance with an alternative embodiment of the present invention, is shown in FIG. 3. In FIG. 3, identical reference numbers are used to refer to corresponding process steps previously described with respect to FIG. 2. This embodiment is substantially identical to that described in FIG. 2, with the addition of the operation of the seat belt payout sensor 36. Consequently, only the additional steps are described below.

Referring to step 112 of FIG. 3, if it is determined that the buckle switch signal from the buckle switch 30 indicates a belted vehicle occupant condition, the process proceeds to step 140. At step 140, the controller 34 samples the seat belt payout sensor signal from the seat belt payout sensor 36.

The process then proceeds to step 142. At step 142 a determination is made whether the amount of payout indicated by the payout signal from the payout sensor 36 exceeds a payout threshold. If the sensed amount of payout exceeds the payout threshold and the sensed occupant weight is less than the weight threshold, the process returns to step 108 to disable the occupant protection device 52. When the seat belt payout sensor 36 provides a signal having a value that exceeds the payout threshold value (e.g., indicating an over-extended seat belt 22) and a the weight threshold is not exceeded, something other than an adult vehicle occupant usually is strapped to the seat. Such circumstances typically do not warrant actuation of the occupant protection device 52 during a vehicle crash event. However, if the determination of step 142 is negative, thereby indicating that the payout threshold is not exceeded, the process proceeds to step 116 and the process continues as described above with respect to FIG. 2.

From the above description of the invention, those skilled in the art will perceive improvements, changes and modifications. For example, it is contemplated that the controller 34 could be configured to control operation of one or both of the other sensors 40, 50, or such control may be shared by the controller and the sensors themselves. Such improvements, changes and modifications within the skill of the art are intended to be covered by the appended claims.

Having described the invention, the following is claimed:

1. A system for controlling a vehicle occupant protection device associated with a vehicle seat, said system comprising:

an occupant weight sensor operative to sense a weight condition of an occupant of the vehicle seat and provide a weight sensor signal, said weight sensor signal varying as a position of the occupant of the vehicle seat varies;

a second sensor operative to sense a second condition of the occupant and provide a second sensor signal;

a controller operative to receive said weight sensor signal and said second sensor signal, said controller analyzing said weight sensor signal and said second sensor signal to determine inconsistencies between the conditions indicated by said weight sensor signal and said second sensor signal, said controller enabling actuation of the occupant protection device if said weight sensor signal and said second sensor signal are inconsistent.

2. A system for controlling a vehicle occupant protection device associated with a vehicle seat, said system comprising:

an occupant weight sensor operative to sense a weight condition of an occupant of the vehicle seat and provide a weight sensor signal;

a second sensor operative to sense a second condition of the occupant and provide a second sensor signal;

a controller operative to receive said weight sensor signal and said second sensor signal, said controller analyzing said weight sensor signal and said second sensor signal to determine inconsistencies between the conditions indicated by said weight sensor signal and said second sensor signal, said controller enabling actuation of the occupant protection device if said weight sensor signal and said second sensor signal are inconsistent; and an acceleration sensor operative to sense acceleration of the vehicle and providing an acceleration signal, and said controller sampling said weight and second sensor signals over time and receiving said acceleration signal, said controller being operative to, in response to said acceleration signal, determine a weight characteristic indicative of how said weight condition is changing over a plurality of sampling intervals and a second characteristic indicative of how said second occupant condition is changing over the plurality of sampling intervals, said controller controlling operation of the occupant protection device based on at least one of said weight and second characteristics.

3. A system as set forth in claim 2 wherein said controller is operative to disable actuation of the occupant protection device if both said weight and second characteristics are consistent and indicate movement of the vehicle occupant forward in the vehicle seat.

4. A system as set forth in claim 3 wherein said controller is operative to determine said weight and second characteristics when said acceleration signal indicates an acceleration level less than about 1 g.

5. A system as set forth in claim 3 further including a buckle sensor operative to detect a belted or unbelted condition of the vehicle occupant and provide a buckle signal indicative thereof, said controller being operative to determine the weight and a static characteristic based on the sensed second condition when the buckle signal indicates a belted condition.

6. A system as set forth in claim 3 further including a buckle sensor operative to detect a belted or unbelted condition of the vehicle occupant and provide a buckle signal indicative thereof, said controller being operative in a second mode to determined said weight and second characteristics when the buckle signal indicates an unbelted condition.

7. A system as set forth in claim 3 wherein said second sensor is an occupant position sensor operative to provide an indication of the vehicle occupant's position relative to a location of the vehicle occupant protection device.

8. A system as set forth in claim 3 further including a payout sensor operative to detect a length of seat belt webbing withdrawn from an associated seat belt retractor and provide a payout signal indicative thereof, said controller disabling the vehicle occupant protection device when the payout signal indicates greater than a predetermined length of webbing withdrawn from the retractor and the weight sensor signal indicates an occupant weight below a weight threshold.

9. A sensing system for use in a vehicle comprising:
at least two sensors, each of said at least two sensors being operative to sense a different condition of a vehicle occupant associated with a vehicle seat and provide a sensor signal indicative of the sensed condition;
an acceleration sensor operative to sense acceleration of the vehicle and provide an acceleration signal; and
a controller responsive to said sensor signals and said acceleration signal, said controller having a first operating mode when the acceleration signal indicates vehicle acceleration less than or equal to a first acceleration threshold and a second operating mode when the acceleration signal indicates acceleration greater than the first acceleration threshold, said controller, when in the first operating mode, being operative to control actuation of an associated vehicle occupant protection device based on the sensed occupant condition being indicated by each of said sensor signals and said acceleration signal indicating a vehicle acceleration above a second acceleration threshold, which is greater than the first acceleration threshold, said controller, when in the second operating mode, being operative to determine an occupant characteristic indicative of how each of the occupant conditions sensed by said at least two occupant condition sensors varies over time and to control actuation of the associated vehicle occupant protection device based on the acceleration signal indicating vehicle acceleration above the second acceleration threshold and based on each of said determined occupant characteristics.

10. A system as set forth in claim 9 wherein said controller is operative, when in said second operating mode, to disable actuation of the associated occupant protection device if both of said determined occupant characteristics indicate movement of the vehicle occupant forward in the vehicle seat.

11. A system as set forth in claim 10 wherein said at least two occupant condition sensors include an occupant weight sensor operative to provide an indication of a vehicle occupant's weight and an occupant position sensor operative to provide an indication of the vehicle occupant's position relative to the associated occupant protection device.

12. A system as set forth in claim 11 further including a payout sensor operative to provide an indication an amount of seat belt that has been withdrawn from an associated retractor, said controller disabling the associated occupant protection device upon determining that the payout signal indicates that the seat belt is withdrawn beyond some predetermined amount and that the occupant's weight is less than or equal to a weight threshold.

13. A system as set forth in claim 10 further including a buckle sensor operative to provide a buckle signal indicative of whether the vehicle occupant is belted, said controller entering said second operating mode only if the buckle signal indicates an unbelted condition of the vehicle occupant.

14. A system as set forth in claim 10 wherein said controller, when in the second operating mode, enables the associated occupant protection device when two of said occupant characteristics are inconsistent.

15. A method for helping to protect a vehicle occupant located in a vehicle seat, said method comprising the steps of:

sensing vehicle acceleration and providing an acceleration signal according to the sensed vehicle acceleration;
sampling over time a first occupant condition signal indicative of a first vehicle occupant condition;
sampling over time a second occupant condition signal indicative of a second vehicle occupant condition;
determining how each of the first and second sampled occupant condition signals vary over a plurality of sampling intervals based on the acceleration signal; and enabling actuation of a vehicle occupant protection device upon determining that the first and second occupant conditions vary inconsistently over the plurality of sampling intervals.

16. A method as set forth in claim 15 wherein said step of determining occurs in response to the vehicle acceleration being greater than a first acceleration threshold, which is less than a second acceleration threshold indicative of a vehicle crash event in which actuation of the occupant protection device is desired.

17. A method as set forth in claim 16 further including the step of disabling actuation of the vehicle occupant protection device upon determining that both of the sampled occupant condition signals over the plurality of sampling intervals indicate movement of the vehicle occupant forward in the vehicle seat.

18. A method as set forth in claim 17 further including disabling the associated occupant protection device, when the acceleration signal indicates vehicle acceleration less than the first acceleration threshold and at least one of the occupant condition signals indicates an occupant condition beyond an associated occupant condition threshold.

* * * * *